United States Patent
Chu et al.

(10) Patent No.: US 7,313,148 B2
(45) Date of Patent: Dec. 25, 2007

(54) METHOD AND SYSTEM FOR TCP LARGE SEGMENT OFFLOAD WITH ACK-BASED TRANSMIT SCHEDULING

(75) Inventors: Hsiao-keng J. Chu, Palo Alto, CA (US); Bruce W. Curtis, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1031 days.

(21) Appl. No.: 10/299,670

(22) Filed: Nov. 18, 2002

(65) Prior Publication Data

US 2004/0095883 A1    May 20, 2004

(51) Int. Cl.
*H04L 12/56* (2006.01)

(52) U.S. Cl. .................................... 370/419

(58) Field of Classification Search ............ 370/389, 370/392, 395.4, 395.52, 419; 709/230–235, 709/250

See application file for complete search history.

(56) References Cited

U.S. PATENT DOCUMENTS

| 5,937,169 A | * | 8/1999 | Connery et al. ............ 709/250 |
| 6,697,868 B2 | * | 2/2004 | Craft et al. .................. 709/230 |
| 6,788,704 B1 | * | 9/2004 | Lindsay ...................... 370/465 |
| 6,904,519 B2 | * | 6/2005 | Anand et al. ................ 713/100 |
| 6,968,358 B2 | * | 11/2005 | Freimuth et al. ........... 709/203 |
| 7,007,103 B2 | * | 2/2006 | Pinkerton et al. ........... 709/238 |
| 7,012,918 B2 | * | 3/2006 | Williams .................... 370/389 |
| 2002/0062333 A1 | * | 5/2002 | Anand et al. ................ 709/105 |
| 2003/0046330 A1 | * | 3/2003 | Hayes ......................... 709/201 |
| 2003/0158906 A1 | * | 8/2003 | Hayes ......................... 709/211 |

OTHER PUBLICATIONS

D. Comer. Internetworking with TCP/IP, Prentice Hall, 2000, pp. 211-226.*

* cited by examiner

*Primary Examiner*—Dmitry Levitan
(74) *Attorney, Agent, or Firm*—Martine Penilla & Gencarella, LLP (57) ABSTRACT

A method and system for offloading the transmission of large blocks of data from Transmission Control Protocol residing on a transmitting host computer to an intelligent network interface card (NIC) that schedules and performs transmittals. The NIC receives a pointer to the location of data to be transmitted, partitions the data into packets and writes sequence numbers in the headers of the packets. The NIC receives acknowledgements (ACKs) from the recipient system which contain a window size and beginning sequence number for the next transmittal. Provided the ACK indicates appropriate forward progress, the NIC continues to transmit until its buffer is empty. By allowing the NIC to process many packets in this fashion, significant burden is taken off the host computer system. In case of no forward progress, as evidenced by a duplicate ACK, or of an empty buffer, NIC returns control to the transmitting host computer for further action.

26 Claims, 5 Drawing Sheets

METHOD AND SYSTEM FOR TCP LARGE SEGMENT OFFLOAD WITH ACK-BASED TRANSMIT SCHEDULING

BACKGROUND OF THE INVENTION

1. Field of the Invention

The present invention relates to the field of transmission control protocol (TCP) and network interface cards (NICs). Specifically, an embodiment of the present invention relates to a method and a system for offloading a large block of data and transferring the management of ack-based data transmittal from TCP to NICs.

2. Related Art

Over the past few decades, computer systems have become corporate-wide resources, essential for day-to-day operations. Additionally, they have been playing an increasingly important role in military and government environments. As strategic and tactical computer communication networks have been developed and deployed, the needs for providing reliable means of interconnecting them and for providing standard interprocess communication protocols to support a broad range of applications has led to the development of inter-process communication protocol standardization.

Transmission Control Protocol (TCP) is a connection-oriented, end-to-end COMMUNICATION protocol designed to fit into a layered hierarchy of protocols that support multi-network applications. TCP provides for interprocess communication between pairs of processes in host computers attached to distinct but interconnected computer communication networks. The TCP operates above a wide spectrum of communication systems ranging from hard-wired connections to packet-switched or circuit-switched networks.

TCP fits into layered protocol architecture just above a basic Internet Protocol (IP) which provides a way for TCP to send and receive variable-length blocks of information enclosed in Internet data-gram "envelopes". Among its multiple functions, the IP also deals with any fragmentation or re-assembly of the TCP segments required to achieve transport and delivery through multiple networks and interconnecting gateways.

TCP interfaces on one side to user or application processes ("host processes") and on the other side to IP. The interface between an application process and TCP consists of a set of calls much like the calls an operating system provides to an application process for manipulating files. For example, there are calls to open and close connections and to send and receive data on established connections.

The primary purpose of TCP is to provide reliable connection service between pairs of processes. To do so requires facilities in a number of areas including basic data transfer, reliability and flow control. TCP is able to transfer a continuous stream of bytes in each direction between its users by packaging some number of bytes into segments for transmission through the Internet system. In general, TCP decides when to block and forward data at its own convenience.

TCP needs to be able to regulate or control its flow of data, and to recover from data that is damaged, lost, duplicated or delivered out of order by the Internet communication system. This is achieved by assigning a sequence number to each byte transmitted, and requiring a positive acknowledgement (ACK) from the receiving TCP. If the ACK is not received within a timeout interval, the data is retransmitted.

At the receiver, the sequence numbers are used to correctly order data portions that may be received out of order and to eliminate duplicates.

TCP provides a means for the receiver to govern the amount of data sent by the sender, known in the art as flow control. This is achieved by returning a "window" with every ACK indicating a range of acceptable sequence numbers beyond the last segment successfully received. The window indicates an allowed number of bytes that the sender may transmit before receiving further permission.

In addition to the TCP's functions of data packaging, data transfer, reliability and flow control, it also has responsibility for multiplexing processes among host computers, establishing connections and tracking precedence and security of communications. Thus, TCP is indeed a busy protocol.

The interface from the host computer to the network is, in many cases, by means of a hardware unit called a network interface card (NIC). This is an expansion board or card that is installed in a host computer to provide a dedicated full-time connection to a network. The NIC has its own processor and, thus, the potential for being programmed to perform certain functions.

Hosts are computers attached to a network and, from the communication network's point of view, are the sources and destinations of packets. The term packet is used generically to mean the data of one transaction between a host and its network. In the conventional art, TCP has responsibility for packaging the data into packets that are no larger than a standard Maximum Transmission Unit (MTU) prior to sending it out. MTUs can be relatively small, e.g., 1,500 bytes on Ethernet. TCP then sends the data packets in response to acknowledgements (ACKs) from the host computer that include the amount of data that may be sent in the next transmission.

In order to alleviate some of the transmit side of the TCP processing cost, a number of hardware/software vendors have provided a basic scheme for offloading to the NIC called "LSO" or large segment offload. In these cases, a larger portion of data is off-loaded and the NIC portions the data into packets. The NIC then sends out two or more packets at a time (rather than one packet at a time as previously provided by TCP alone), depending on the size of the window opened by a previously received ACK. The window is often small and can only accommodate two packets. These schemes, although providing a modicum of relief to the TCP, have not provided a significant improvement in host processing performance. The TCP still has responsibility for interfacing with the recipient host and responding to acknowledgements by instructing the NIC to send out more data.

SUMMARY OF THE INVENTION

Accordingly, a need exists for a method and system for further reducing the burden on the TCP by having the Network Interface Card (NIC) handle some of the flow control responsibility on the transmission side of the network interface. The present invention provides a novel solution to these needs.

Specifically, one embodiment of the present invention provides a method and system for partitioning and transmitting data in a network. A transmission control protocol (TCP) running on a host computer system first performs a slow start and then sends to a NIC a location and a first sequence number for a set or "chunk" of data to be transmitted. The network interface card accesses the set of data, partitioning the set of data into sequential data packets of maximum transmission unit (MTU) size and writes incremental sequence numbers in headers of the sequential data packets.

The NIC waits for a first acknowledgement (ack) from the receiver system and then transmits a first set of sequential data packets and awaits an acknowledgement from a receiving host computer. When the NIC receives the acknowledgement containing a window size and a range of sequence numbers expected by the receiving host computer for a subsequent transmittal, the NIC transmits a subsequent transmittal per the window size and sequence numbers in the acknowledgement and awaits a next acknowledgement. This process may continue with each acknowledgement reporting forward progress in the transmission. Forward progress in the transmission defines a "fast path" of the communication that is controlled by the NIC rather than by the host TCP. During "fast path," acknowledgements are echoed to the TCP.

When an ACK fails to report forward progress, this is often an indication of packet loss. The transmission control is then returned to the transmitting host computer for further decision making since recovering lost packets is a more complex job and is better left to the host. When the transmitting host computer resolves the reason for the sequence numbers being unchanged, it returns control to the NIC.

When the NIC has transmitted all the sequential data packets it has partitioned, it returns control to the transmitting host computer for either ceasing transmission or for sending to the NIC a data location of another data chunk for further partitioning and transmitting.

The NIC is an intelligent device, containing a processor. The NIC provides network interface for a plurality of TCP connections and matches an acknowledgement with an appropriate one of the transmitting connections. By allowing the NIC to transmit and control the transmission of several data packets during the "fast path" portion, the host computer system is relieved of a significant amount of processing.

These and other advantages of the present invention will become obvious to those of ordinary skill in the art after having read the following detailed description of the preferred embodiments that are illustrated in the accompanying drawings.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic information capable of being stored, transferred, combined, compared, and otherwise manipulated in a computer system. It has proven convenient at times, principally for reasons of common usage, to refer to these information as transactions, bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "transmitting," "receiving," "partitioning", "acknowledging," "opening," "stopping," "dropping out," "duplicating," "accumulating", or the like, refer to actions and processes of a computer system or similar electronic computing device. The computer system or similar electronic computing device manipulates and transforms data represented as physical (electronic) quantities within the computer system memories, registers or other such information storage, transmission or display devices. The present invention is well suited to the use of other computer systems.

Exemplary Computer System

Figure 1:
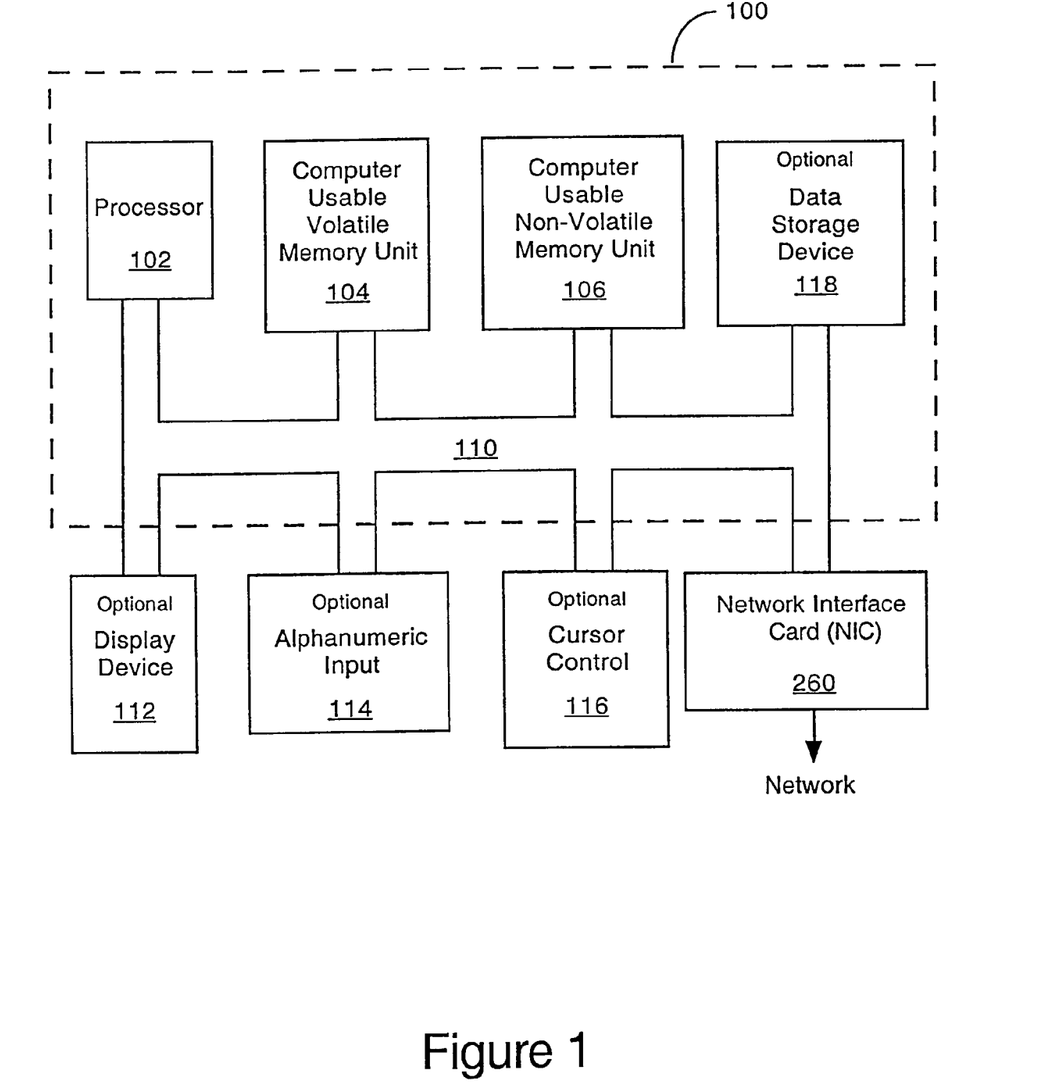
FIG. 1 is a block diagram of an exemplary computer system upon which embodiments of the present invention may be practiced.

FIG. 1 is a block diagram of one embodiment of an exemplary computer system 100 used in accordance with the present invention. It should be appreciated that system 100 is not strictly limited to be a computer system. As such, system 100 of the present embodiment is well suited to be any type of computing device (e.g., data router, server computer, portable computing device, desktop computer, etc.). Within the following discussions of the present invention, certain processes and steps are discussed that are realized, in one embodiment, as a series of instructions (e.g., software program) that reside within computer readable memory units of computer system 100 and executed by a processor(s) of system 100. When executed, the instructions cause computer 100 to perform specific actions and exhibit specific behavior that is described in detail below.

Computer system 100 of FIG. 1 comprises an address/data bus 110 for communicating information and one or more central processors 102 coupled with bus 110 for processing information and instructions. Central processor unit(s) 102 may be a microprocessor or any other type of processor. Computer 100 also includes data storage features such as a computer usable volatile memory unit 104 (e.g., random access memory, static RAM, dynamic RAM, etc.) coupled with bus 110 for storing information and instructions for central processor(s) 102, a computer usable non-volatile memory unit 106 (e.g., read only memory, programmable ROM, flash memory, EPROM, EEPROM, etc.) coupled with bus 110 for storing static information and instructions for processor(s) 102.

System 100 also includes a network interface card (NIC) 260 coupled with bus 110 for enabling system 100 to interface with other electronic devices and computer systems. NIC 260 of the present embodiment may interface with wired and/or wireless communication technology. Within the present embodiment, the NIC communication interface 260 is a dedicated, full-time connection to the Internet that has intelligence and that may operate based on firmware or other-state machine instructions located within.

Optionally, computer system 100 may include an alphanumeric input device 114 including alphanumeric and function keys coupled to the bus 110 for communicating information and command selections to the central processor(s) 102. The computer 100 can include an optional cursor control or cursor directing device 116 coupled to the bus 110 for communicating user input information and command selections to the central processor(s) 102. The system 100 can also include a computer usable mass data storage device 118 such as a magnetic or optical disk and disk drive (e.g., hard drive or floppy diskette) coupled with bus 110 for storing information and instructions. An optional display device 112 is coupled to bus 110 of system 100 for displaying video and/or graphics.

Figure 2:
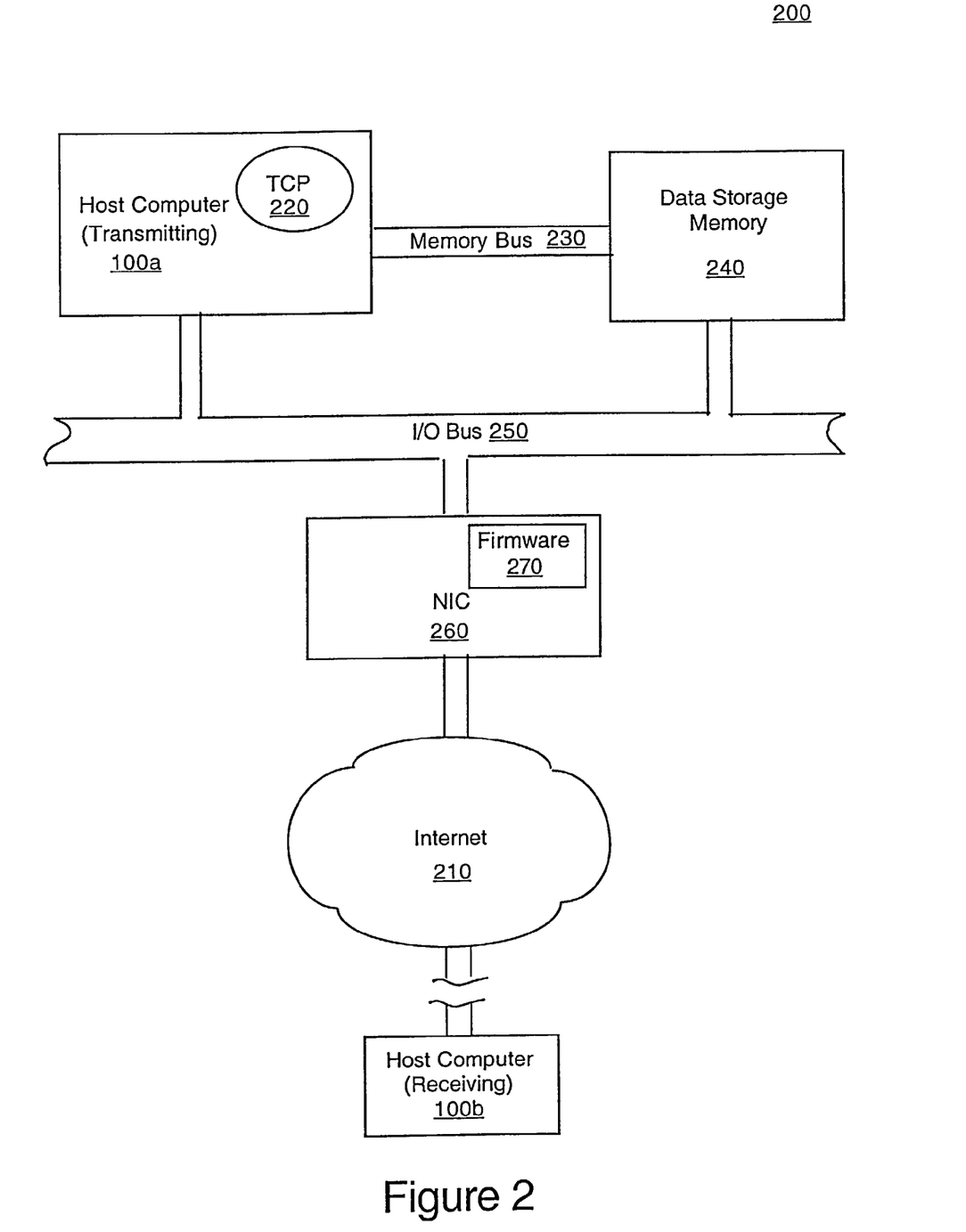
FIG. 2 is a block diagram illustrating an exemplary network of communicatively coupled devices upon which embodiments of the present invention may be practiced.

FIG. 2 is a block diagram of host computer systems 100a and 100b coupled in an exemplary network 200 upon which embodiments of the present invention can be implemented. The computer systems 100a and 100b may be physically in separate locations (e.g., remotely separated from each other). It is appreciated that the present invention can be utilized with any number of computer systems.

Network 200 may represent a portion of a communication network located within a firewall of an organization, corporation or financial institution (an "Intranet"), or network 200 may represent a portion of the World Wide Web or Internet 210. The mechanisms for coupling computer systems 100a and 100b over the Internet (or "Intranet") 210 are well known in the art. In one exemplary configuration, host computer 100a and memory 240 are coupled to I/O bus 250 and to Internet (or "Intranet") 210 via Network Interface Card (NIC) 260. TCP (Transmission Control Protocol) 220 is a software implemented transmission protocol that is resident on host computer system 100a. In one embodiment, host computer 100a utilizes IP (Internet Protocol) and TCP 220 to transmit data to host computer 100b via NIC 260 and Internet 210.

It should be understood that, although the present embodiment is described in terms of IP and TCP, it is well suited to for a variety of protocols. In one embodiment host computer 100a is coupled to high-speed memory bus 230 for transmitting data to and from memory 240. In one embodiment, multi-level secure operating environment protocols like Trusted Solaris 8, manufactured by Sun Microsystems, Inc. or other multi-level secure operating environments may be used in conjunction with IP, TCP 220, HTTP (HyperText Transfer Protocol) and/or SSL (Secure Sockets Layer) to transport data between clients and servers or between servers and servers, in either direction.

NIC 260 of FIG. 2 may provide a dedicated, full-time connection to Internet 210. According to one embodiment, NIC 260 is an intelligent device containing a processor that may be programmed to perform specific functions. Among these functions, according to one embodiment, is the ability to partition data from data storage memory 240, as handed off to NIC 260 by TCP 220 residing in the stack of host computer 100a, into data packets and transmit the packets to receiving host computer 100b via Internet 210. According to one embodiment, NIC 260 may receive acknowledgements from host computer 100b that contain the window size and sequence numbers of a next expected transmittal. The NIC then, according to one embodiment, transmits the appropriate data packets to host computer 100b in response to the acknowledgements. NIC may operate based on firmware or other-state machine instructions located therein.

Figure 3A:
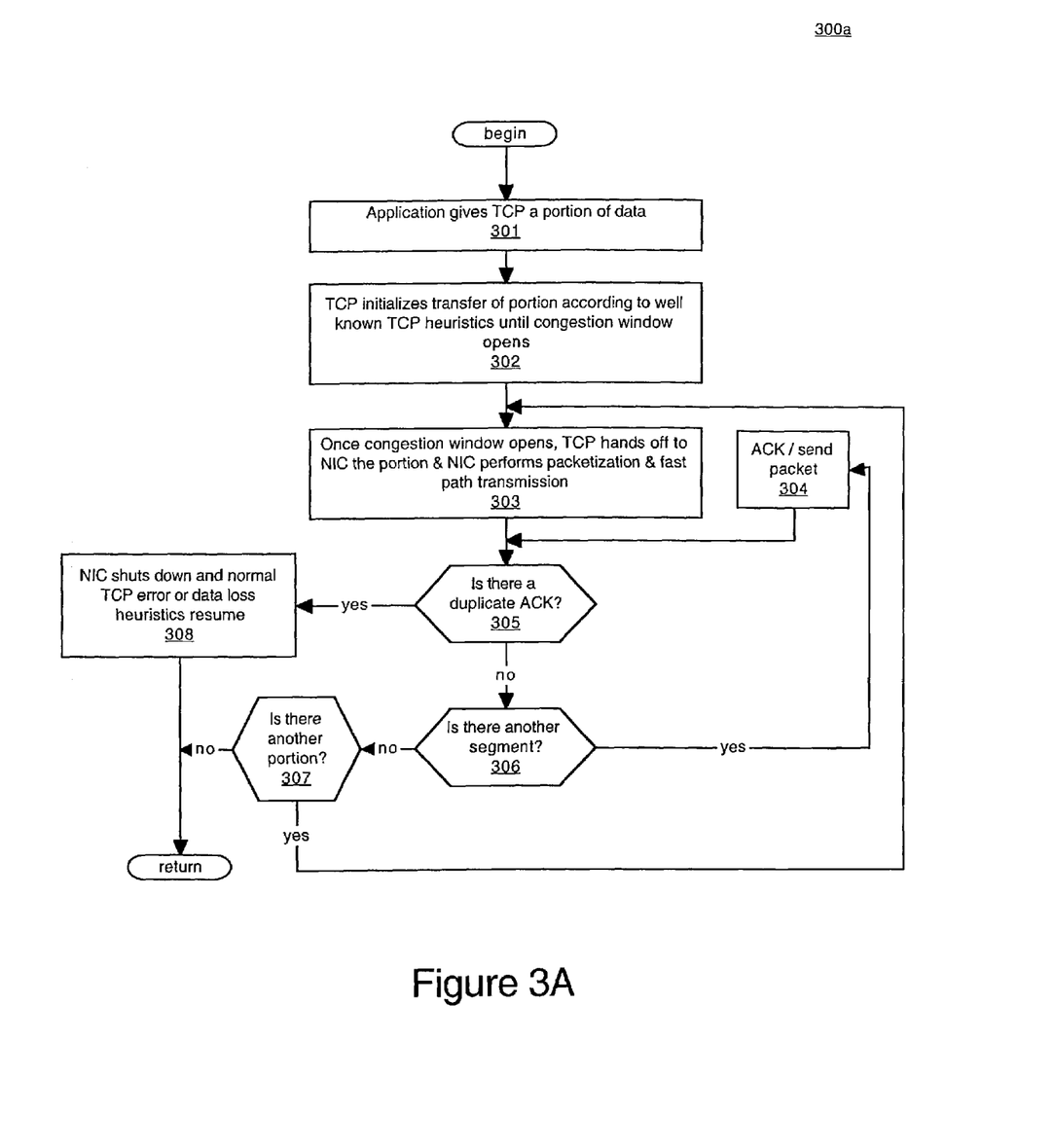
FIG. 3A is a flow diagram illustrating an overview of a method for transmitting data within a network in accordance with one embodiment of the present invention.

FIG. 3A is a flow diagram 300a illustrating an overview of a method for transmitting data within a network in accordance with one embodiment of the present invention. Although specific steps are disclosed in flow diagram 300a, such steps are exemplary. That is, the present invention is well suited to performing various other steps or variations of the steps recited in FIG. 3A.

At step 301 of FIG. 3A, an application executing on a transmitting host computer (e.g., host computer 100a of FIG. 2) gives to the TCP (e.g., 220) a portion of data to be transmitted. At step 302, the TCP initializes the transfer of the portion of data according to well-known TCP heuristics. This includes the transmission of a large burst of data to potentially fill the buffer of a recipient host computer (e.g., 100b of FIG. 2). There is a quantity known as a "congestion window" that is calculated by TCP and that defines the amount of data that will fill the buffer. When the buffer is full, the congestion window opens and this ends a portion of the process known as "slow start".

"Fast path" transmission is illustrated at step 303 as the congestion window opens and TCP hands off a portion of data to be transmitted to a Network Interface Card (NIC) (e.g., NIC 260). The NIC then partitions the data into smaller packets and awaits an acknowledgement (ACK) from the recipient host computer. The recipient host computer receives the data and begins opening a window for receiving additional data and returns an ACK with pertinent information regarding the data received and the size of the open window for a next transmittal. This information includes the sequence number of the next packet to be transmitted and the size of the available window, indicating the number of packets that may be sent. Once an initial ACK is received, the NIC sends the appropriate number of packets and continues to receive ACKs and transmit packets, as illustrated in step 304, as long as forward progress is detected. Forward progress is indicated by increasing acknowledgement numbers received in the ACK. The NIC echoes the ACK to the TCP residing on host computer 100a so that the transmitting host is, in effect, monitoring the transmission, even though it is not actively involved.

If a duplicate ACK is received, as shown by step 305 of FIG. 3A, a loss of data or other error is indicated. Should this occur, the NIC shuts down the transmission process and the host regains control. Normal TCP error or data loss heuristics then resume as shown in step 308. As long as there is additional in the buffer, the TCP continues to hand off the packetization and transmission to the NIC as shown by step 306. If the buffer is empty, control is returned to the application for additional portions of data as shown by step 307. If there are no additional portions of data, flow diagram 300a is exited.

Figure 3B:
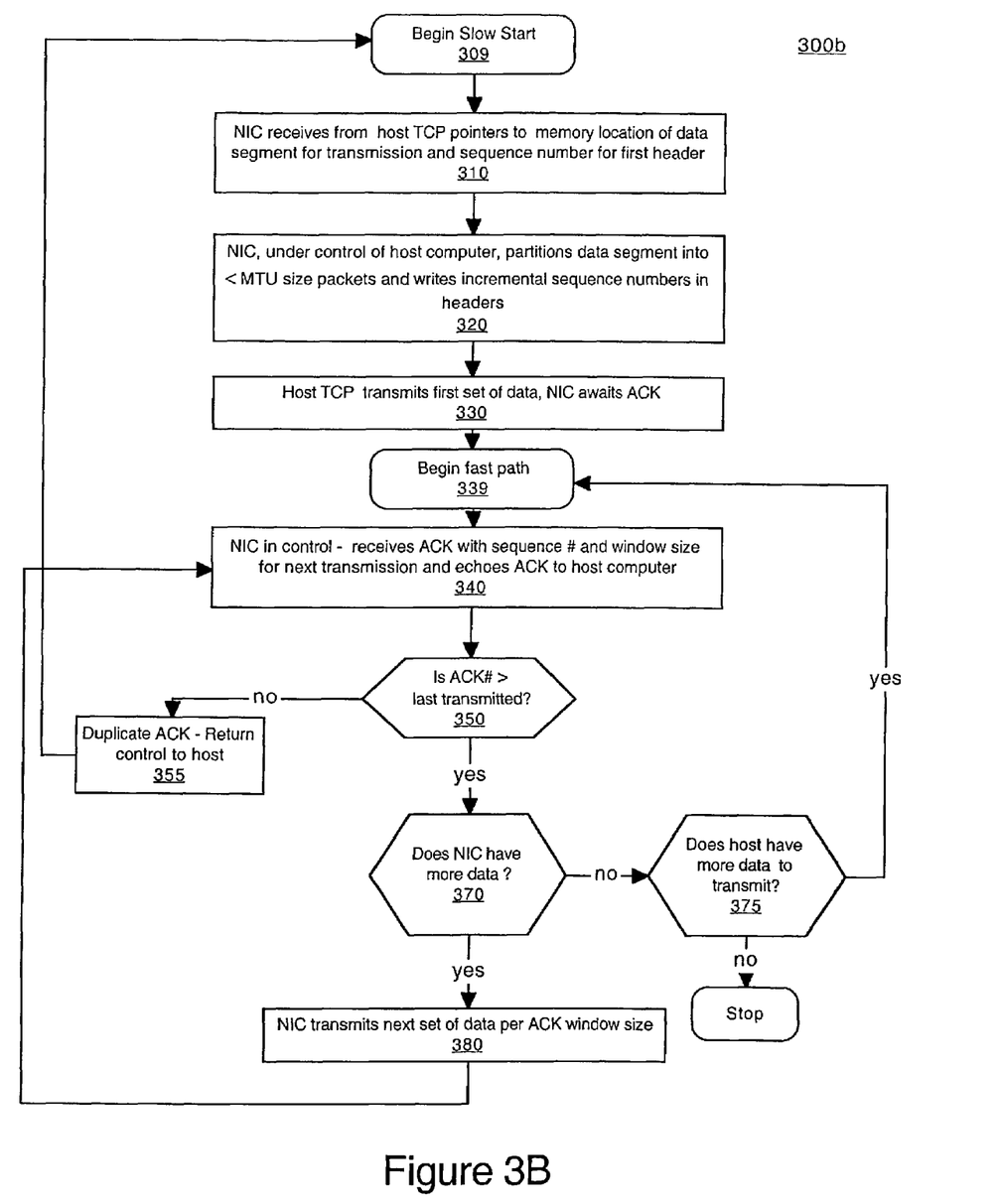
FIG. 3B is a flow diagram illustrating a method for transmitting data within a network in accordance with one embodiment of the present invention.

FIG. 3B is a flow diagram 300b illustrating, in more detail, a method for transmitting data within a network in accordance with one embodiment of the present invention. Although specific steps are disclosed in flow diagram 300b, such steps are exemplary. That is, the present invention is well suited to performing various other steps or variations of the steps recited in FIG. 3B.

The process begins with a "slow start" in which the NIC (e.g., NIC 260 of FIG. 2) performs the steps under control of TCP (e.g., TCP 220 of FIG. 2). Steps 310 through 330 are part of the slow start that is consistent with the conventional art.

At step 310, according to one embodiment, NIC (e.g., NIC 260 of FIG. 2) receives, from TCP 220 residing in the stack of a host computer (e.g., computer 100a of FIG. 2), pointers to locations in memory (e.g. memory 240 of FIG. 2) and a beginning sequence number for a portion of data to be transmitted to a receiving computer (e.g., computer 100b of FIG. 2).

At step 320 of FIG. 3B, NIC 260 partitions the data portion, according to one embodiment, into packets that meet the size requirements of Maximum Transmission Units (MTU's), e.g., approximately 1,500 bytes in one example. It should be appreciated that the packet size need not be limited to MTU size, but may be sized according to the requirements of any protocol being employed. In one embodiment, NIC 260 then writes incremental sequence numbers into the headers of the data packets, starting with the beginning sequence number received from TCP 220.

A first set of data is sent, as illustrated by step 330 of FIG. 3B, by NIC 260 under the control of TCP residing on the host computer that may, according to one embodiment, be sized according to the congestion window size for the protocol being used. Once the window is filled, receiving computer 100b slides the window open in smaller data portions so as not to overload its buffers. For example, TCP protocol for the World Wide Web calls for the receiving computer to slide the window by two (2) packets (a packet being approximately 1500 bytes) at a time for transmissions subsequent to the initial one. (Refer to FIG. 4 for an example of data flow according to one embodiment of the present invention.)

NIC 260 waits for an acknowledgement signal (ACK) from the recipient host computer that will begin the "fast path" portion of the transmission process as indicated by step 339. At step 340 of FIG. 3B, according to one embodiment, NIC 260 receives an ACK from receiving computer 100b containing the beginning sequence number and the window size for a next transmission. The NIC echoes the ACK to the host computer. The TCP residing on the host monitors the ACK. If the ACK is a duplicate of the previous one, it signifies a potential error or data loss and the host TCP takes over and normal TCP error or data loss heuristics prevail. Otherwise, the host is in a monitoring-only mode and is not involved in the fast path transmission.

At step 350, NIC 260 compares the sequence numbers received by the ACK (ACK number) to the previous ACK number. Provided the ACK number received is greater than the previously received ACK number, indicating forward progress, and there are more data packets to be transmitted as checked at step 370, according to one embodiment the process continues at step 380. Otherwise the process moves to step 355 for missing data or to step 375 for exhausted data packets. At step 380, NIC 260 transmits the next set of data based on the window size received by the ACK.

Still referring to FIG. 3B, if the ACK number received has not increased, a loss of data is indicated. In such an instance, NIC 260 would stop its activity and return control to the transmitting host computer 100a and TCP 220 to reconcile the missing data as shown at step 355. Once the control is returned to TCP and data loss is reconciled, the process may begin again at step 309.

The process path from step 340 to step 350 to step 370 to step 380 and back to step 340 makes up the "fast path." By allowing the NIC to control this fast path portion of the transmission, significant processing burden is offloaded from the host computer system processor.

At step 375 of FIG. 3B, NIC 260 refers to host computer 110a for additional data. If there is additional data to be transmitted, TCP 220 residing on host computer 110a forwards pointers and a beginning sequence number per step 339 of flow chart 300b and the process continues from there. With no additional data to be transmitted, flow diagram 300b is exited.

Figure 4:
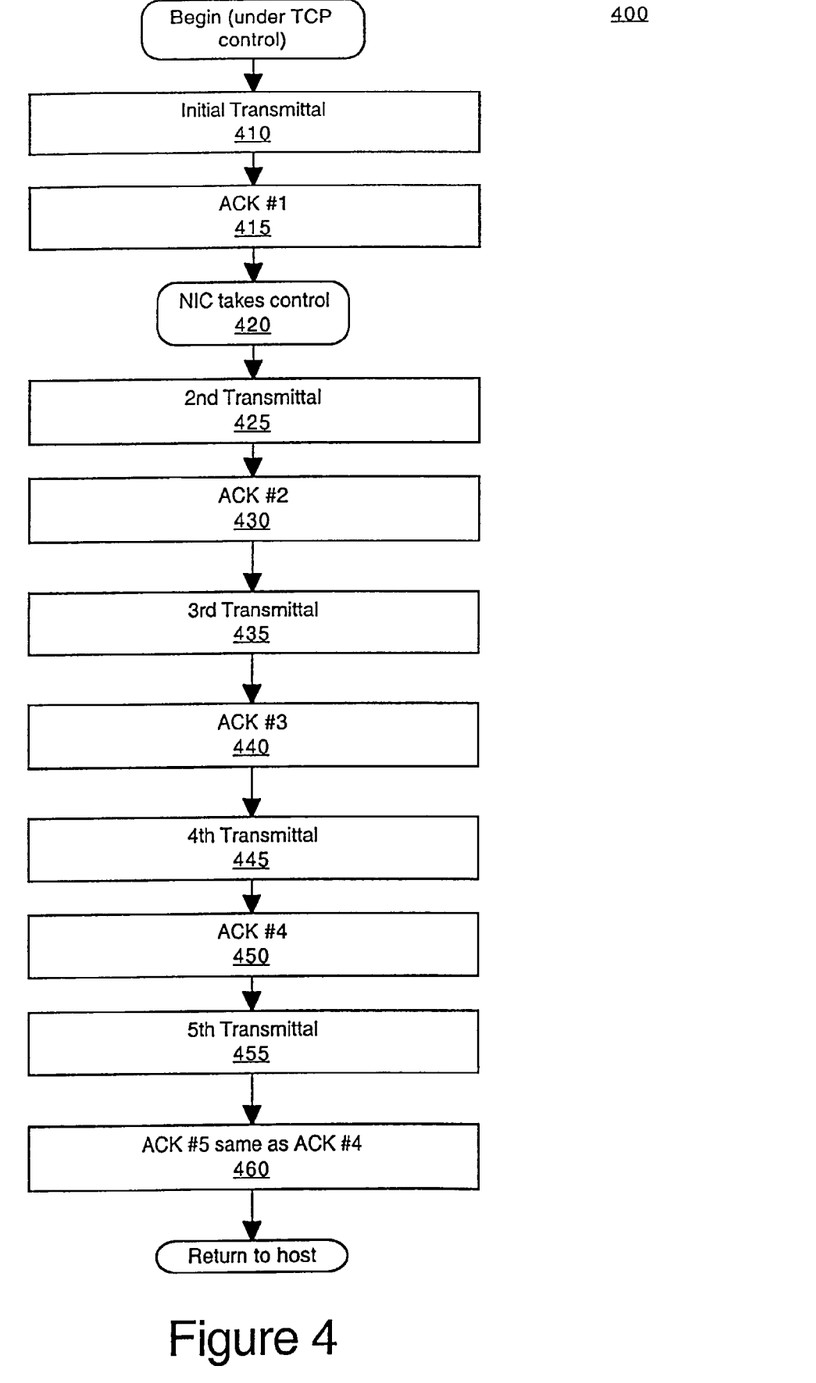
FIG. 4 is a block diagram illustrating data flow as controlled by the NIC in accordance to one embodiment of the present invention.

FIG. 4 is a block diagram 400 illustrating one example of data flow as controlled by TCP and the NIC in accordance to one embodiment of the present invention. Although specific data transmittal sizes and transmittal steps are disclosed in block diagram 400, such data transmittal sizes and steps are exemplary. That is, the present invention is well suited to transmitting various other sizes of data packets or performing variations of the steps recited in FIG. 4. Specifically, the example of FIG. 4 assumes a data pipeline of length zero for explanation purposes.

As the process begins, the NIC receives instructions from the TCP according to well-known TCP heuristics. Step 410 of block diagram 400 represents, according to one embodiment, an initial data transmittal by the TCP. According to TCP, this transmittal may be a block of 32,000 bytes of data. Once received by a receiving host computer operating with TCP protocol (e.g., Host computer 100b of FIG. 2), recipient host computer 100b sends a first acknowledgement, illustrated by block 415, containing the sequence numbers and window size for a second transmittal.

NIC receives ACK #1 at step 415 and NIC assumes control of the process that is referred to as the "fast path" portion of the transmittal as shown at step 420. The NIC, according to one embodiment, having partitioned the data into packets of 1500 bytes sends a second transmittal, per block 425, of 2 data packets, sequenced by numbers 32,001 through 35,000.

Following the same example, according to one embodiment, ACK #2 of block 430 might return a sequence number of 35,001 and a window size of 3000 bytes. According to one embodiment, NIC 260 sends a third transmittal at block 435 that may contain 2 data packets sequenced 35,001 through 38,000. The third acknowledgement from host computer 100b, ACK #3 of block 440, may contain sequence 38,001 and window size of 3000 bytes. Continuing at block 445, according to one embodiment, NIC 260 may send two data packets sequenced from 38,001 through 41,000. ACK # 4, received by NIC 260 at block 450 may contain sequence number 41,001 and a 3000 byte window according to one embodiment. At block 455, NIC transmits two data packets containing sequence numbers 41,001 through 44,000. ACK #5, returned at block 460, contains sequence number 41,001 and 3000 byte window. This is a duplicate ACK signifying that transmittal number five was dropped, and, according to one embodiment, NIC 260 drops out of the process and transmission control returns to TCP 220 and transmitting host computer 100a.

The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for partitioning and transmitting data in a network, said method comprising:
   a) sending to a network interface card by a transmission control protocol of a host computer system, a set of data to be transmitted;
   b) said network interface card accessing said set of data, partitioning said set of data into sequential data packets; and
   c) said network interface card transmitting sequential data packets in response to respective acknowledgements from a receiving computer, said respective acknowledgements being echoed to, and monitored by, said host computer system, said c) continuing under control of said network interface card while said respective acknowledgements indicate forward progress in transmission, otherwise returning transmission control to said transmission control protocol of said host computer system.

2. The method as described in claim 1 wherein said network interface card comprises a processor.

3. The method as described in claim 1 wherein said network interface card provides network interface for a plurality of transmitting host computers.

4. A communication system comprising:
   a host processor implementing a transmission control protocol (TCP), wherein said TCP is for initiating a transmission of a data block to a receiver system wherein a first portion of said data block is transmitted under control of said TCP; and
   a network interface card (NIC) under control of said TCP implemented by said host processor, communicatively coupled to said host processor and for controlling transmission of a second portion of said data block by:
   a) segmenting said second portion into a plurality of data packets;
   b) transmitting individual data packets to said receiver system in response to respective acknowledgements received from said receiver system, the NIC echoing said respective acknowledgements to said host processor, said TCP implemented by the host processor monitoring said respective acknowledgements;
   c) determining if a duplicate acknowledgement is detected; and
   d) continuing said b) and said c) while said second portion contains data to be transmitted and no duplicate acknowledgement is received from said receiver system.

5. A communication system as described in claim 4 wherein said NIC controls said transmission further by e) ceasing transmission of said plurality of data packets upon a duplicate acknowledgement being detected.

6. A communication system as described in claim 5 wherein said TCP is further for resuming control of transmitting a remainder of said second data portion to said receiver system in response to said duplicate acknowledgement being detected.

7. A communication system as described in claim 4 wherein each data packet of said plurality of data packets contains a sequence number in its header and wherein said TCP provides a start sequence number to said NIC for said second portion.

8. A communication system as described in claim 7 wherein each acknowledgement from said receiver system comprises a sequence number and a window size.

9. A communication system comprising:
   a host processor implementing a transmission control protocol (TCP), wherein said TCP is for initiating a transmission of a data block to a receiver system wherein a first portion of said data block is transmitted under control of said TCP; and
   a network interface card (NIC) under control of said TCP implemented by said host processor, communicatively coupled to said host processor and for controlling transmission of a second portion of said data block by:
   a) segmenting said second portion into a plurality of data packets;
   b) transmitting individual data packets to said receiver system in response to respective acknowledgements received from said receiver system, the NIC echoing said respective acknowledgements to said host processor, said TCP implemented by the host processor monitoring said respective acknowledgements;
   c) determining if said acknowledgements indicate forward progress in said transmission of said second portion; and
   d) continuing said b) and said c) while said second portion contains data to be transmitted and said acknowledgements indicate said forward progress.

10. A communication system as described in claim 9 wherein said acknowledgements indicate forward progress by comprising unique sequence numbers.

11. A communication system as described in claim 9 wherein said NIC controls said transmission further by e) ceasing transmission of said plurality of data packets upon said acknowledgements ceasing to indicate said forward progress.

12. A communication system as described in claim 11 wherein said TCP is further for resuming control of transmitting a remainder of said second data portion to said receiver system in response to said acknowledgements ceasing to indicate said forward progress.

13. A communication system as described in claim 9 wherein each data packet of said plurality of data packets contains a sequence number in its header and wherein said TCP provides a start sequence number to said NIC for said second portion.

14. A communication system as described in claim 13 wherein each acknowledgement from said receiver system comprises a sequence number and a window size.

15. A method of communication comprising:
   a) initiating a transmission of a data block to a receiver system wherein a first portion of said data block is transmitted, wherein said a) is performed by a transmission control protocol (TCP) software module executed by a host processor of a computer system; and
   b) controlling transmission of a second portion of said data block, said b) performed by a network interface card (NIC) communicatively coupled to said host processor and wherein said b) comprises:
      b1) segmenting said second portion into a plurality of data packets;
      b2) transmitting individual data packets to said receiver system in response to respective acknowledgements received from said receiver system, the NIC echoing said respective acknowledgements to said host processor, said TCP executed by the host processor monitoring said respective acknowledgements;
      b3) determining if said acknowledgements indicate forward progress in said transmission of said second portion; and
      b4) continuing said b2) and said b3) while said second portion contains data to be transmitted and said acknowledgements indicate said forward progress.

16. A method as described in claim 15 wherein said acknowledgements indicate forward progress by comprising unique acknowledgement numbers.

17. A method as described in claim 15 wherein said b) further comprises b5) ceasing transmission of said plurality of data packets upon said acknowledgements ceasing to indicate said forward progress.

18. A method as described in claim 17 further comprising c) said TCP software module resuming control of transmitting a remainder of said second data portion to said receiver system in response to said acknowledgements ceasing to indicate said forward progress.

19. A method as described in claim 15 wherein each data packet of said plurality of data packets contains a sequence number in its header and wherein said TCP software module provides a start sequence number to said NIC for said second portion.

20. A method as described in claim 19 wherein each acknowledgement from said receiver system comprises an acknowledgement number and a window size.

21. A method of communication controlled by a network interface card, said network interface card controlled by a host processor, said method comprising:
   a) accessing a portion of data to be transmitted to a receiver system and accessing a start sequence number;
   b) segmenting said portion of data into a plurality of data packets each comprising a sequence number referenced from said start sequence number;
   c) transmitting individual data packets to said receiver system in response to respective acknowledgements received from said receiver system said respective acknowledgements being echoed to, and monitored by, said host processor;
   d) determining if said acknowledgements indicate forward progress in transmission of said portion of data to said receiver system; and
   e) continuing said c) and said d) while said portion of data contains data to be transmitted and said acknowledgements indicate said forward progress.

22. A method as described in claim 21 wherein said acknowledgements indicate forward progress by comprising unique acknowledgement numbers.

23. A method as described in claim 21 further comprising ceasing transmission of said plurality of data packets upon said acknowledgements ceasing to indicate said forward progress.

24. A method as described in claim 23 further comprising f) a TCP software module resuming control of transmitting a remainder of said portion of data to said receiver system in response to said acknowledgements ceasing to indicate said forward progress.

25. A method as described in claim 21 wherein each data packet of said plurality of data packets contains a sequence number in its header and wherein said TCP software module provides a start sequence number to said NIC for said second portion.

26. A method as described in claim 25 wherein each acknowledgement from said receiver system comprises an acknowledgement number and a window size.

* * * * *